US006877019B2

(12) United States Patent
Bandy et al.

(10) Patent No.: US 6,877,019 B2
(45) Date of Patent: Apr. 5, 2005

(54) BARREL SHIFTER

(75) Inventors: James Henry Bandy, Huntington Beach, CA (US); Hongliang Zhao, Irvine, CA (US)

(73) Assignee: 3DSP Corporation, Irvine, CA (US)

(*) Notice: Subject to any disclaimer, the term of this patent is extended or adjusted under 35 U.S.C. 154(b) by 636 days.

(21) Appl. No.: 10/043,631

(22) Filed: Jan. 8, 2002

(65) Prior Publication Data

US 2003/0131029 A1 Jul. 10, 2003

(51) Int. Cl.[7] .................................................. G06F 5/01
(52) U.S. Cl. ...................................................... 708/209
(58) Field of Search .......................................... 708/209

(56) References Cited

U.S. PATENT DOCUMENTS 4,653,019 A * 3/1987 Hodge et al. ............... 708/209
5,020,013 A 5/1991 Maher, III et al. ...... 364/715.08
5,155,698 A 10/1992 Niimi .................... 364/715.08
5,818,894 A 10/1998 Song ........................... 377/69
5,948,099 A * 9/1999 Crawford et al. ........... 712/225
6,006,244 A 12/1999 Mahurin ..................... 708/209
6,098,087 A * 8/2000 Lemay ....................... 708/209
2001/0009010 A1 * 7/2001 Sugeno et al. .............. 708/209

* cited by examiner

*Primary Examiner*—D. H. Malzahn
(74) *Attorney, Agent, or Firm*—Robert Moll

(57) ABSTRACT

The present invention relates to a barrel shifter for manipulating bits within computer words. The barrel shifter includes multiple multiplexer stages for rotating single and multiple words. In several embodiments, it provides a half-word alignment in a $2^n$-bit barrel shifter, rotates a single 32-bit data word or two 16-bit data words, rotates a $2^n$-bit data word or two $2^{n-1}$-bit data half-words, a method of operating a $2^n$-bit barrel shifter to rotate two $2^{n-1}$-bit data words, multiplexer stages for rotating the bits to the left or right based on control signals, such that the stages do not require 2:1 multiplexers between the first and second stages.

5 Claims, 5 Drawing Sheets

BARREL SHIFTER

BACKGROUND

The present invention relates to digital circuits used to manipulate words of binary data, and in particular to a circuit for rotating the bits inside single or multiple data operands.

Data within a computer or other digital circuit is typically organized into one or more standard data sizes, referred to as data words. For example, a very common data word size contains 32 bits of binary data. The size of the data word affects precision and/or resolution of the information contained within the digital circuit, with larger data sizes allowing greater precision and/or resolution because they can represent more values. Larger data words, however, require larger digital circuits to manipulate the data, leading to greater cost and complexity. In addition to manipulating data of a maximum data size, many digital circuits also allow data of smaller, evenly divided sizes to be manipulated. For example, a digital circuit with a maximum data word size of 32 bits might also manipulate 8-bit or 16-bit data. A data operand that is half the size of the maximum data word is typically called a half-word. When the extra precision is not required, manipulating smaller data operands may provide advantages such as requiring less memory to store the data or allowing multiple data operands to be manipulated simultaneously by the same circuit.

Two operations that have proven to be useful when working with digital data are rotation and shifting. The bits of data within a data word are arranged in a fixed order, typically from most significant bit (MSB) in the leftmost position to least significant bit (LSB) in the rightmost position. The rotation operation takes a data word as an input operand and rearranges the order of the bits within that data word by moving bit values to the left or the right by a number of bit positions which may be fixed or may be specified by a second input operand. When rotating to the left, bit values which are moved past the MSB bit position are inserted into the right side bit positions which have been left vacant by the other bits being moved to the left. When rotating to the right, bits which are moved past the LSB bit position are inserted into the left side bit positions in the same manner. For example, consider a 32-bit data word:

0101 0001 0000 0000 0000 0000 1010 1110

An instruction to rotate this data word left by four bits results in the new value:

0001 0000 0000 0000 0000 1010 1110 0101

Since the values of the bits that are being rotated out the top or bottom of the data word are wrapped around and inserted at the other end of the data word, no bit values are lost.

The second operation, shifting, also takes a data word as an input operand and rearranges the order of the bits within that data word by moving bit values to the left or the right by a number of bit positions which may be fixed or may be specified by a second input operand. A shift operation, however, discards the bit values that are moved past the MSB or LSB bit positions. The bit positions that are left empty by the shift operation are filled with a fixed value, most commonly either with all 0s or all 1s. As an example, consider a 32-bit data word:

0101 0001 0000 0000 0000 0000 1010 1110

An instruction to shift this word left by four bits while inserting 0s results in the new value:

0001 0000 0000 0000 0000 1010 1110 0000

It is also common when shifting to the right to use the value of the MSB bit position to fill the bit positions that are left empty. For signed binary numbers, this has the property of ensuring that the number keeps the same sign.

Barrel shifters permit rotation or shifting of an n-bit word to the left or right by 0, 1, 2, . . . n−1 bits. When implementing with standard logic cells, barrel shifters are typically constructed out of multiple stages of multiplexers. In general, a multiplexer is essentially a selector that selects one of multiple inputs to be the output based on one or more control inputs. The two most prevalent types of multiplexers are 2:1 multiplexers that have two data inputs and one control input that selects the output and 4:1 multiplexers that have four data inputs and two control inputs that select the output. Each stage of the barrel shifter requires one multiplexer for each bit of the data operand to be rotated or shifted. Each multiplexer's inputs are connected to the input data word in a uniform pattern relative to the output bit that multiplexer produces. For example, for the pattern n, n−1, n−2, and n−3, the 4:1 multiplexer that produces output bit 31 would be connected to input bits 31, 30, 29, and 28. A stage of multiplexers with this pattern would allow a rotate left by 0, 1, 2, or 3 bits.

A barrel shifter for 32-bit data operands can be constructed using three stages of multiplexers. The first stage uses 4:1 multiplexers with the pattern n, n−1, n−2, and n−3 to rotate left by 0, 1, 2, or 3 bits. The second stage uses 4:1 multiplexers with the pattern n, n−4, n−8, and n−12 to rotate left by 0, 4, 8, or 12 bits. The third stage uses 2:1 multiplexers with the pattern n and n−16 to rotate left by 0 or 16 bits. To rotate a data operand left by 21 bits, the first stage would rotate left by one. Then the second stage would rotate left by four. Finally, the third stage would rotate left by sixteen. Since rotation is circular, rotates right may be handled by rotating left by 32 minus number of bits to rotate right. Insertion of ones or zeros as required for shifting operations can be handled in a fourth stages that follows the three stages of rotation performed by the multiplexers.

This 32-bit barrel shifter may be modified to process two 16-bit data operands simultaneously, providing high data throughput for 16-bit data without the increase in physical area that would be required for separate circuits for 16-bit data. Modifying this 32-bit barrel shifter to process two 16-bit data operands requires special handling where the bits being rotated cross the half-word boundary. Previous solutions used additional 2:1 multiplexers before the first and second multiplexer stages to select the correct input bits depending on whether 16 or 32-bit data was being rotated. For example, consider the inputs needed to generate output bit 17 from the first stage where the pattern is n, n−1, n−2, or n−3. For 32-bit data, the inputs are bits 17, 16, 15, and 14. For 16-bit data, the correct inputs are bits 17, 16, 31, and 30. In this approach, two additional 2:1 multiplexers are used to select between bits 15 and 31 and between bits 14 and 30 depending on the input data size. These additional multiplexers, however, increase the number of levels of logic required to calculate the result, decreasing the circuit's maximum speed performance, and increase the physical size of the circuit.

SUMMARY OF THE INVENTION

The invention relates to a flexible barrel shifter and methods of rotations of data operands. In one embodiment, the invention provides a barrel shifter with multiple stages for rotating single and multiple data words with minimal logic. In another embodiment, the invention provides a device for half-word alignment in a $2^n$-bit barrel shifter. In another, the invention provides a method of rotating either a single 32-bit data word or two 16-bit data words. In another, the invention provides for rotating a $2^n$-bit data word or two $2^{n-1}$-bit data half-words. In another, the invention provides a method of operating a $2^n$-bit barrel shifter to rotate two $2^{n-1}$-bit data words.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is best determined by reference to the claims.

Figure 1:
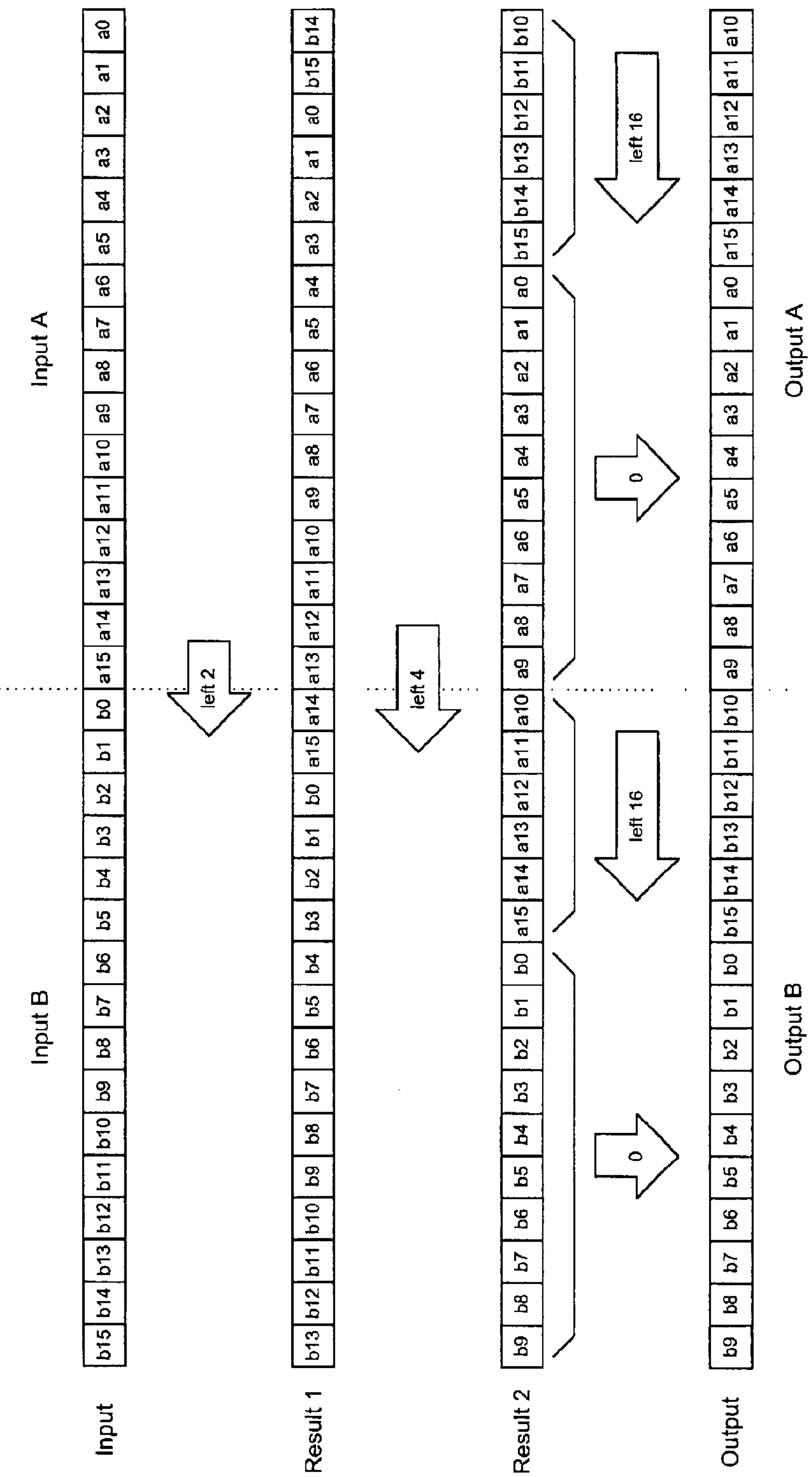
FIG. 1 illustrates the rotating of two data half-words in a barrel shifter.

FIG. 1 illustrates the basic functionality of an embodiment of a barrel shifter. It illustrates the barrel shifter rotating left by six bits two 16-bit data half words represented by a0–a15 and b0–b15. Each set of arrows represents one stage of rotation. The first stage rotates the data left by two bits. The second stage rotates the data left by another four bits. The third stage rotates selective bits left by 16 bits and the remaining bits by zero. FIG. 1 therefore shows how a barrel shifter uses the third stage to realign the two 16-bit words into the upper and lower 16-bit output fields. When used to rotate a 32-bit word, the third stage will uniformly rotate all bits by either 0 or 16 bits.

Figure 2:
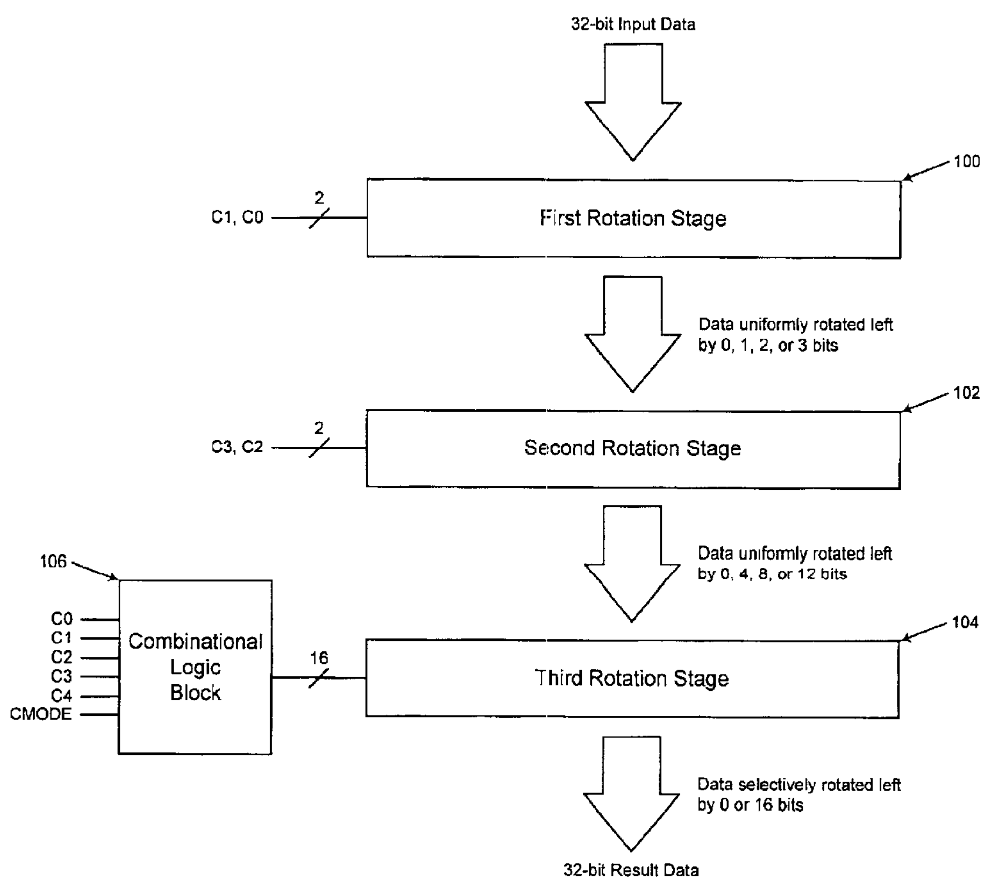
FIG. 2 illustrates the high-level architecture and flow of data through a 32-bit barrel shifter.

FIG. 2 illustrates the high-level architecture and flow of data through a 32-bit barrel shifter. A first rotation stage 100 receives 32 bits of input data and two control signals C0, C1. The first rotation stage 100 rotates the input data by 0, 1, 2, or 3 bits responsive to control signals C0, C1 and outputs the rotated data to a second rotation stage 102. The second rotation stage 102 receives the 32 bits of data and two control signals C2, C3. The second rotation stage 102 rotates the data by 0, 4, 8, or 12 bits responsive to the control signals C2, C3 and outputs the data to a third rotation stage 104. The third rotation stage 104 receives the 32 bits of data, and sixteen control signals from a combinational logic block 106. The third rotation stage 104 rotates the data by 0 or 16 bits in response to the sixteen control signals shown entering stage 104 on the left and outputs the 32-bit result data from the barrel shifter. The combinational logic block 106 receives the control signals C0, C1, C2, C3, C4, and CMODE, and produces sixteen controls signals that are output to the third rotation stage 104.

Figure 3:
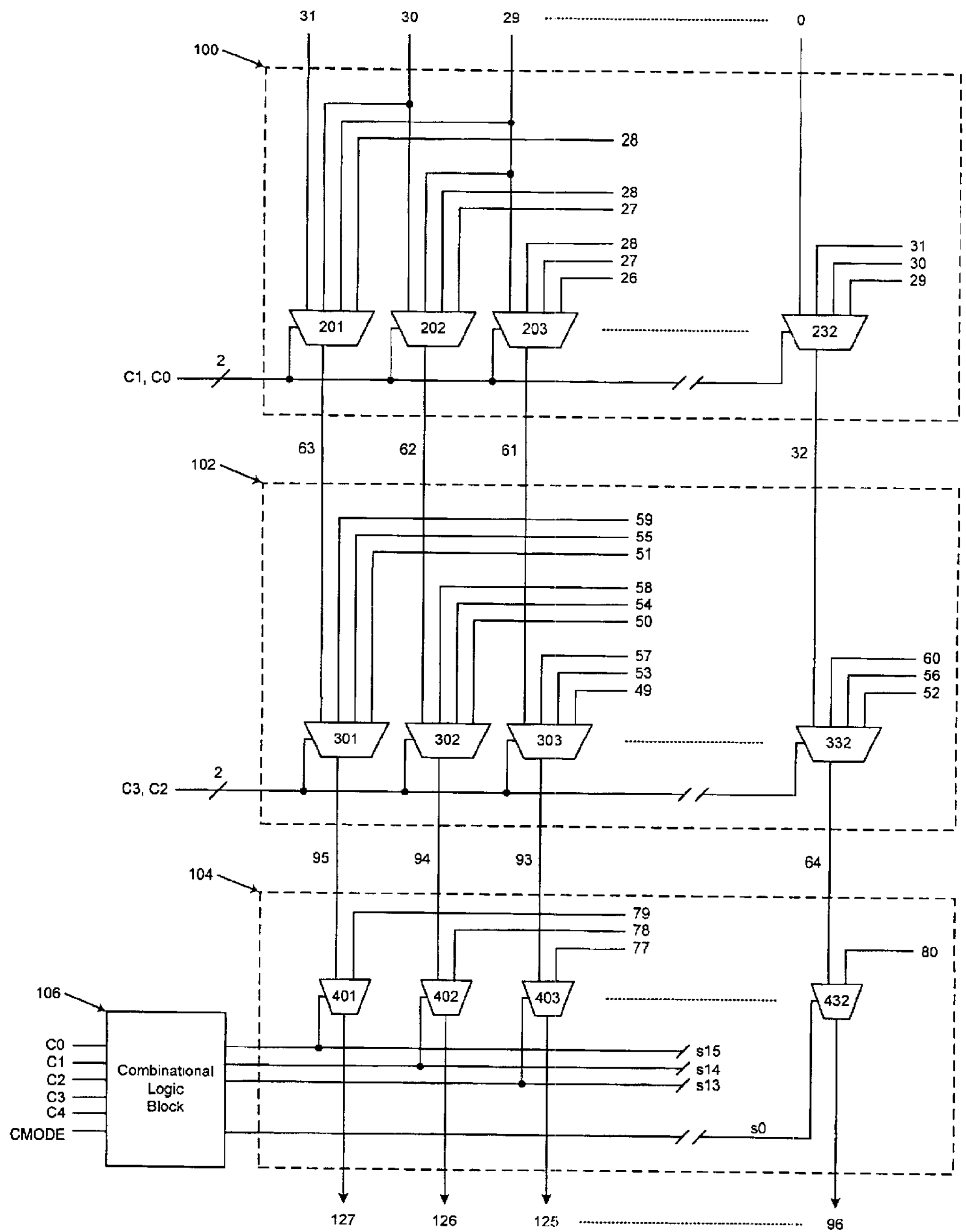
FIG. 3 illustrates a 32-bit barrel shifter for manipulating 16-bit data.

FIG. 3 illustrates an embodiment of a 32-bit barrel shifter for manipulating either a 32-bit word or two 16-bit half-words. The first rotation stage 100 includes 32 individual 4:1 multiplexers, represented by multiplexer 201, multiplexer 202, multiplexer 203, and multiplexer 232. Control signals C0 and C1 are connected to the select inputs for each multiplexer. The data inputs for multiplexer 201 are connected to input bits 31, 30, 29, and 28. The data inputs for multiplexer 202 are connected to input bits 30, 29, 28, and 27. The data inputs for multiplexer 203 are connected to input bits 29, 28, 27, and 26. The data inputs for multiplexer 232 are connected to input bits 0, 31, 30, and 29. The remaining multiplexers (not shown) are connected in a similar manner to four data input bits with the pattern n, n−1, n−2, and n−3 with 32 added to any value less than zero and where n ranges from 28 down to 1. The outputs from the 32 multiplexers, represented by lines 63, 62, 61, and 32, are the inputs of the second rotation stage 102.

The second rotation stage 102 includes 32 individual 4:1 multiplexers, represented in by multiplexer 301, multiplexer 302, multiplexer 303, and multiplexer 332. Control signals C2 and C3 are connected to the select inputs for each multiplexer. Data inputs for multiplexer 301 are connected to lines 63, 59, 55, and 51. Data inputs for multiplexer 302 are connected to lines 62, 58, 54, and 50. Data inputs for multiplexer 303 are connected to lines 61, 57, 53, and 49. Data inputs for multiplexer 332 are connected to lines 32, 60, 56, and 52. The remaining multiplexers (not shown) are connected in similar manner to four data input lines with the pattern n, n−4, n−8, and n−12 with 32 added to any value less than 32 and where n ranges from 60 down to 33. The outputs from the 32 multiplexers, represented by the lines 95, 94, 93, and 64, are the inputs of the third rotation stage 104.

The third rotation stage 104 includes 32 individual 2:1 multiplexers, represented by multiplexer 401, multiplexer 402, multiplexer 403, and multiplexer 432. Data inputs for the multiplexer 401 are connected to lines 95 and 79. Data inputs for multiplexer 402 are connected to lines 94 and 78. Data inputs for multiplexer 403 are connected to lines 93 and 77. Data inputs for multiplexer 432 are connected to lines 64 and 80. The remaining multiplexers (not shown) are connected in similar manner to two data input lines with the pattern n and n−16 with 32 added to any value less than 64 and where n ranges from 92 down to 65. The outputs from the 32 multiplexers, represented by lines 127, 126, 125, and 96, are the final outputs from the barrel shifter circuit.

Figure 4:
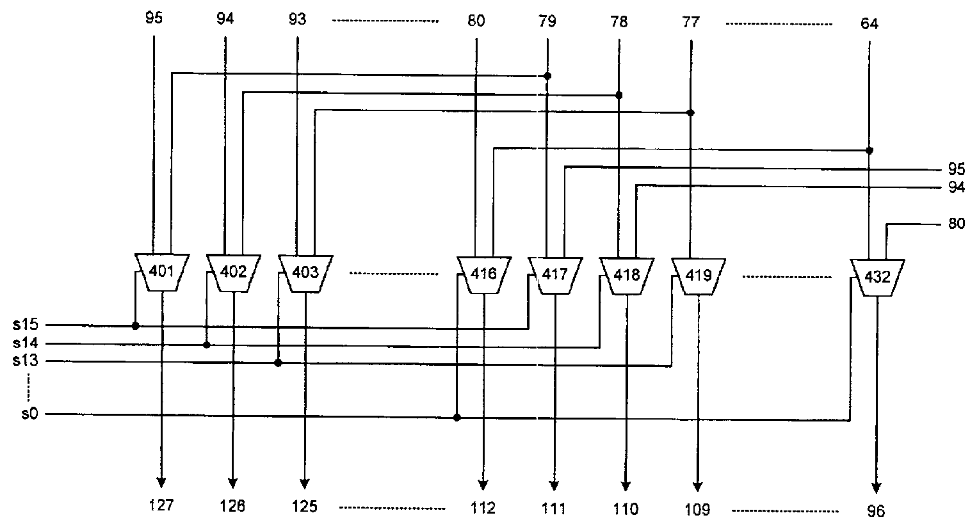
FIG. 4 illustrates the details of the third multiplexer stage as shown in FIG. 2 and FIG. 3.

The control signals C0, C1, C2, C3, C4, and CMODE are inputs to the combinational logic block 106. The combinational logic block 106 produces sixteen multiplexer select signals, s0 to s15. Referring to FIG. 4, the select signals, s0–s15 connect to pairs of multiplexers in the third rotation silage 104. For example, select signal s15 connects to the select input of multiplexer 401 and multiplexer 417. The first data input for multiplexer 401 is connected to line 95 and the second data input is connected to line 79. The first data input for multiplexer 417 is connected to line 79 and the second data input is connected to line 95. In a similar manner, the inputs to each 2:1 multiplexer in this rotation stage are offset sixteen bits. Also each pair of input lines connects to two multiplexers, with the connection to the second multiplexer in reverse order from the connection to the first multiplexer. Thus, each of the select signals s0–s15 connects to the two multiplexers that are connected to the same two input lines. FIG. 4 illustrates this by showing that, for example, select line s14 connects to multiplexer 402 and multiplexer 418, select line s13 connects to multiplexer 403 and multiplexer 419, and select line s0 connects to multiplexer 416 and multiplexer 432.

Figure 5:
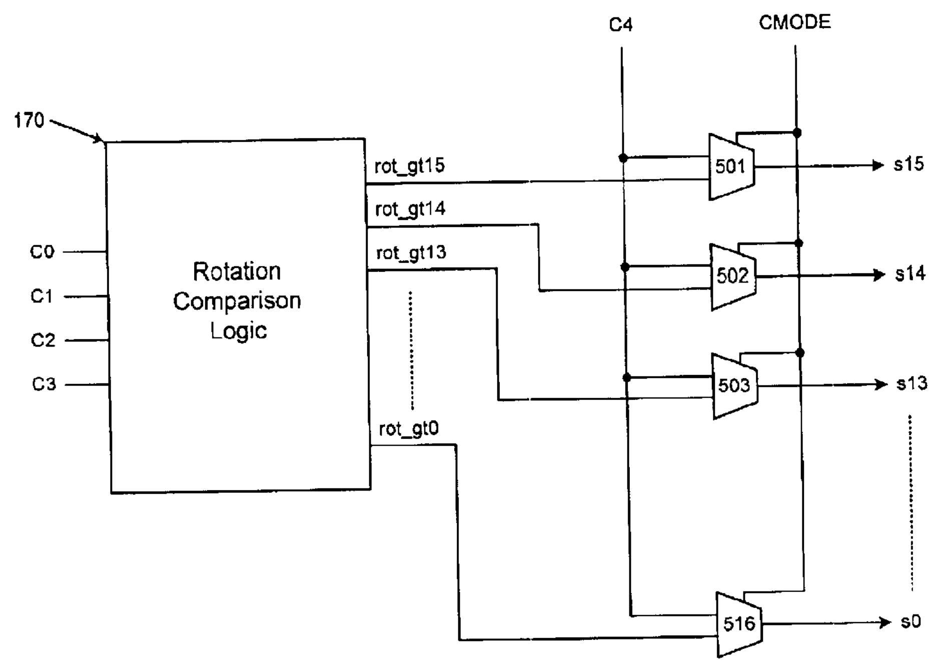
FIG. 5 illustrates certain details of the combinational logic block as shown in FIG. 2 and FIG. 3.

FIG. 5 illustrates the details of one embodiment of the combinational logic block 106 shown in FIGS. 2–3. The combinational logic block 106 includes a rotation comparison logic block 170, which receives control signals C0, C1, C2, and C3 and generates sixteen output signals that individually indicate whether the amount of rotation is greater than 0, 1, . . . 15.

Combinational logic block 106 also includes sixteen 2:1 multiplexers, represented by multiplexers 501, 502, 503, and 516, which multiplex between the rotate greater than signals, rot_gtn (where n=0, 1, . . . 15) and the C4 control signal. The CMODE control signal is connected to the select input for all these multiplexers. In one embodiment, the rotation comparison logic block 170 is implemented to generate sixteen output signals, rot_gt0-rot_gt15, in accordance with the following Boolean equations:

rot_gt0=C3 OR C2 OR C1 OR C0
rot_gt1=C3 OR C2 OR C1
rot_gt2=C3 OR C2 OR (C1AND C0)
rot_gt3=C3 OR C2
rot_gt4=C3 OR (C2 AND (C1 OR C0))
rot_gt5=C3 OR (C2 AND C1)
rot_gt6=C3 OR (C2 AND C1 AND C0)
rot_gt7=C3
rot_gt8=C3 AND (C2 OR C1 OR C0)
rot_gt9=C3 AND (C2 OR C1)
rot_gt10=C3 AND (C2 OR (C1 AND C0))
rot_gt11=C3 AND C2
rot_gt12=C3 AND C2 AND (C1 OR C0)
rot_gt13=C3 AND C2 AND C1
rot_gt14=C3 AND C2 AND C1 AND C1
rot_gt15=0

The logic for these equations may be written in a high level language such as VHDL and synthesized or designed directly using techniques such as schematic capture.

One advantage of the present invention is the third rotation stage can handle 16-bit data in a manner that does not require additional 2:1 multiplexers in the first and second rotation stages. The third stage of conventional barrel shifters was only used for 32 bit words and was applied uniformly to all of the bits. The third stage of the embodiments described can function the same for 32-bit data, but can be used selectively for 16-bit data depending on the bit position and rotation amount. This selective shifting of 16-bit data allows rotation of two 16-bit half-words without adding additional logic into the data operand data path. Consider a rotate left by one bit of two 16-bit data operands for an example of how this technique works. For the following 32-bit input data word:

0000 0110 0110 0000 1111 0000 1111 0000 the output value after the second stage would be:

0000 1100 1100 0001 1110 0001 1110 0000

Bit 16 contains the original bit 15 value from the lower 16-bit data input and bit 0 contains the original bit 31 value from the higher 16-bit data input. For this rotation amount, only the rot_gt0 signal will assert. In the third stage, the rot_gt0 signal will cause bit 16 and bit 0 to rotate left by 16 while the other bits do not rotate to produce the result:

0000 1100 1100 0000 1110 0001 1110 0001

By selectively rotating these two bits, the correct output is produced with all data kept within the proper 16-bit data field Implementing a barrel shifter that handles both 32 and 16-bit data in this manner as opposed to one that uses additional multiplexers in stages one and two will provide better speed performance since the critical delay path requires contains fewer levels of logic. While requiring additional physical area for the combinational logic block, if implemented efficiently this area can be slightly smaller than the area that would be required for extra multiplexers in stages one and two. It will be understood after review of the specification that the invention is not limited to 32-bit words and 16-bit words, for example, it also applies to any $2^n$-bit data word or two $2^{n-1}$-bit data half-words such as 64-bit words etc.

What is claimed:

1. A barrel shifter comprising:

a first multiplexer stage having input terminals for receiving 32-bit input data and producing first rotated data by rotating the input data by a selectable number of either 0, 1, 2, or 3 bits responsive to first and second control signals (C0, C1);

a second multiplexer stage coupled to the first multiplexer stage for receiving the first rotated data output from the first multiplexer stage and producing second rotated data by rotating the first rotated data by a selectable number of either 0, 4, 8, or 12 bits responsive to the third and fourth control signals (C2, C3);

a third multiplexer stage coupled to the second multiplexer stage for receiving the second rotated data from the second multiplexer stage and producing third rotated data by rotating second rotated data by a selectable number of either 0 or 16 bits responsive to first, second, third, fourth, fifth, and sixth control signals (C0, C1, C2, C3, C4, CMODE), wherein for one value of the sixth control signal, the fifth control signal determines the rotation, while for the other value of the sixth control signal, the first, second, third, and fourth control signals determine the rotation individually for each bit.

2. A device for half-word alignment in a $2^n$-bit barrel shifter comprising:

a multiplexer stage receiving $2^n$-bit data from a barrel shifter stage and producing output data with individual bits selectively rotated by 0 or $2^{n-1}$ bits depending on the position of the individual bit in the $2^n$-bit data and on control signals indicating the rotation amount and whether the data size of the input data to the barrel shifter is $2^n$ or $2^{n-1}$-bits.

3. A method of rotating either a single 32-bit data word or two 16-bit data words, comprising:

receiving 32 bits of input data;

uniformly rotating the input data by 0, 1, 2, or 3 bits to produce first shifted data;

uniformly rotating the first shifted data by 0, 4, 8, or 12 bits to produce second shifted data; and selectively rotating individual bits of the second shifted data by 0 or 16 bits, depending for 32-bit data word input on the amount of the shift desired and for two 16-bit data words input on the amount of the shift desired and the position of the individual bit within the data word.

4. A method of rotating a $2^n$-bit data word or two $2^{n-1}$-bit data half-words, comprising:

receiving $2^n$ bits of input data;

uniformly rotating the input data by 0 to $(2^{n-1}-1)$ bits to produce first shifted data; and selectively rotating individual bits of the first shifted data by 0 or $2^{n-1}$ bits, depending for $2^n$-bit data word input on the amount of the shift desired and for two $2^{n-1}$-bit data words input on the amount of the shift desired and the position of the individual bit within the data word.

5. A method of operating a $2^n$-bit barrel shifter to rotate two $2^{n-1}$-bit data words comprising:

selectively rotating individual bits of the two $2^{n-1}$-bit data words by 0 or $2^{n-1}$ bits, depending on the amount of the shift desired and the position of the individual bit within the data words.

* * * * *